United States Patent
Blomgren et al.

(10) Patent No.: US 9,099,738 B2
(45) Date of Patent: Aug. 4, 2015

(54) LITHIUM SECONDARY BATTERIES WITH POSITIVE ELECTRODE COMPOSITIONS AND THEIR METHODS OF MANUFACTURING

(75) Inventors: George Blomgren, Lakewood, OH (US); Dania Ghantous, Walnut Creek, CA (US); On Chang, San Jose, CA (US); Ou Mao, Pleasanton, CA (US); Peter Hallac, Fremont, CA (US); Syed Aziz, Milpitas, CA (US)

(73) Assignee: BASVAH LLC, Menlo Park, CA (US)

( * ) Notice: Subject to any disclaimer, the term of this patent is extended or adjusted under 35 U.S.C. 154(b) by 1029 days.

(21) Appl. No.: 12/264,217

(22) Filed: Nov. 3, 2008

(65) Prior Publication Data

US 2010/0112443 A1 May 6, 2010

(51) Int. Cl.
| | |
|---|---|
| B05D 5/12 | (2006.01) |
| H01M 4/13 | (2010.01) |
| H01M 4/485 | (2010.01) |
| H01M 4/131 | (2010.01) |
| H01M 4/1391 | (2010.01) |
| H01M 4/505 | (2010.01) |
| H01M 4/525 | (2010.01) |
| H01M 4/58 | (2010.01) |
| H01M 10/052 | (2010.01) |
| H01M 4/02 | (2006.01) |
| H01M 10/0525 | (2010.01) |

(52) U.S. Cl.
CPC ............ *H01M 4/485* (2013.01); *H01M 4/131* (2013.01); *H01M 4/1391* (2013.01); *H01M 4/505* (2013.01); *H01M 4/525* (2013.01); *H01M 4/5825* (2013.01); *H01M 10/052* (2013.01); *H01M 4/02* (2013.01); *H01M 10/0525* (2013.01); *H01M 2004/021* (2013.01); *H01M 2004/028* (2013.01); *Y02E 60/122* (2013.01); *Y02T 10/7011* (2013.01)

(58) Field of Classification Search
USPC ........................................................ 427/123
See application file for complete search history.

(56) References Cited

U.S. PATENT DOCUMENTS

| | | | |
|---|---|---|---|
| 4,327,157 A | 4/1982 | Himy et al. | |
| 4,363,707 A | 12/1982 | Prigent et al. | |
| 5,478,671 A | 12/1995 | Idota | |
| 5,543,249 A | 8/1996 | Takeuchi et al. | |
| 5,932,632 A * | 8/1999 | Biensan et al. | 523/161 |
| 6,337,156 B1 | 1/2002 | Narang et al. | |
| 6,623,890 B2 | 9/2003 | Munakata et al. | |
| 6,679,926 B1 * | 1/2004 | Kajiura et al. | 29/623.1 |
| 6,682,849 B2 * | 1/2004 | Narang et al. | 429/218.1 |
| 6,964,828 B2 | 11/2005 | Lu et al. | |
| 6,982,132 B1 * | 1/2006 | Goldner et al. | 429/162 |
| 7,087,348 B2 | 8/2006 | Holman et al. | |
| 7,217,476 B2 | 5/2007 | Omaru | |
| 7,258,821 B2 | 8/2007 | Yang et al. | |
| 7,338,734 B2 | 3/2008 | Chiang et al. | |
| 7,348,101 B2 | 3/2008 | Gozdz et al. | |
| 7,554,290 B2 | 6/2009 | Johnson et al. | |
| 2002/0009645 A1 | 1/2002 | Shima et al. | |
| 2002/0041047 A1 * | 4/2002 | Josephy et al. | 264/81 |
| 2002/0055040 A1 | 5/2002 | Mukherjee et al. | |
| 2002/0106566 A1 | 8/2002 | Nemoto et al. | |
| 2003/0082452 A1 | 5/2003 | Ueda et al. | |
| 2003/0099884 A1 | 5/2003 | Chiang et al. | |
| 2003/0203282 A1 | 10/2003 | Grugeon et al. | |
| 2004/0241545 A1 | 12/2004 | Ochiai et al. | |
| 2005/0136329 A1 | 6/2005 | Howard, Jr. et al. | |
| 2006/0051671 A1 | 3/2006 | Thackeray et al. | |
| 2006/0093871 A1 * | 5/2006 | Howard et al. | 429/9 |
| 2006/0093920 A1 | 5/2006 | Cheon et al. | |
| 2006/0134521 A1 | 6/2006 | Shima | |
| 2006/0257743 A1 | 11/2006 | Kuratomi et al. | |
| 2007/0059598 A1 | 3/2007 | Yang | |

(Continued)

FOREIGN PATENT DOCUMENTS

| | | |
|---|---|---|
| CN | 1505847 A | 6/2004 |
| CN | 1672220 A | 9/2005 |

(Continued)

OTHER PUBLICATIONS

Sigma Alderich, http://www.sigmaaldrich.com/chemistry/stockroom-reagents/learning-center/technical-library/particle-size-conversion.html, Mar. 12, 2009.*

(Continued)

*Primary Examiner* — Austin Murata
(74) *Attorney, Agent, or Firm* — Wilson Sonsini Goodrich & Rosati

(57) ABSTRACT

Positive electrodes for secondary batteries formed with a plurality of substantially aligned flakes within a coating. The flakes can be formed from metal oxide materials and have a number average longest dimension of greater than 60 μm. A variety of metal oxide or metal phosphate materials may be selected such as a group consisting of $LiCoO_2$, $LiMn_2O_4$, $Li(M1_{x1}M2_{x2}Co_{1-x1-x2})O_2$ where M1 and M2 are selected from among Li, Ni, Mn, Cr, Ti, Mg, or Al, $0 \leq x1 \leq 0.5$ and $0 \leq x2 \leq 0.5$, or alternatively, $LiM1_{(1-x)}Mn_xO_2$ where $0 < x < 0.8$ and M1 represents one or more metal elements. Methods for making positive electrode materials are also provided involving the formation of structures with a desired longest dimension, preferably polycrystalline flakes. A cathode coating containing polycrystalline flakes may be deposited onto a conductive substrate and pressed to a desired final electrode thickness.

18 Claims, 8 Drawing Sheets

(56) References Cited

U.S. PATENT DOCUMENTS

| | | |
|---|---|---|
| 2007/0290387 A1* | 12/2007 | Chen et al. ............ 264/39 |
| 2008/0050655 A1* | 2/2008 | Chu et al. ............ 429/231.8 |
| 2008/0182170 A1 | 7/2008 | Rong et al. |
| 2008/0193841 A1 | 8/2008 | Sun et al. |
| 2008/0193846 A1 | 8/2008 | Morishima |
| 2008/0213668 A1 | 9/2008 | Muraoka et al. |
| 2008/0280205 A1 | 11/2008 | Jiang et al. |
| 2009/0087740 A1 | 4/2009 | Deguchi et al. |
| 2009/0148377 A1 | 6/2009 | Moshage et al. |
| 2011/0274976 A1 | 11/2011 | Blomgren et al. |

FOREIGN PATENT DOCUMENTS

| | | |
|---|---|---|
| CN | 1856890 A | 11/2006 |
| CN | 1943060 A | 4/2007 |
| CN | 101117235 | 2/2008 |
| CN | 101189747 A | 5/2008 |
| EP | 1 207 572 A1 | 5/2002 |
| EP | 1 722 428 A1 | 11/2006 |
| EP | 1 927 581 A9 | 6/2008 |
| EP | 1 936 721 A1 | 6/2008 |
| JP | H 08180904 A | 7/1996 |
| JP | 9309728 | 12/1997 |
| JP | 2004296367 A | 10/2004 |
| JP | 2007173210 | 7/2007 |
| JP | 20077213875 | 8/2007 |
| WO | WO 2006/104367 A2 | 10/2006 |
| WO | WO 2006/126854 A1 | 11/2006 |
| WO | WO 2006/104367 A3 | 4/2007 |
| WO | WO 2007/048283 A1 | 5/2007 |
| WO | WO 2007/140014 A2 | 12/2007 |
| WO | WO 2007/140014 A3 | 5/2008 |
| WO | WO 2008/086041 A1 | 7/2008 |
| WO | WO 2009/128879 A2 | 10/2009 |
| WO | WO 2009/128879 A3 | 2/2010 |

OTHER PUBLICATIONS

International search report and written opinion dated Jul. 27, 2011 for PCT Application No. US2010/055008.

International search report dated Dec. 17, 2009 for PCT/US2009/063182.

Kanamura, et al. Hydrothermal synthesis of LiFeP04 as a cathode material for lithium batteries. J Mats Sci. 2007; 43(7):2138-2142. Abstract only.

U.S. Appl. No. 13/505,739, filed May 2, 2012, Mao et al.

Kanamura, et al. Hydrothermal synthesis of LiFeP04 as a cathode amterial for lithium batteries. J Mats Sci. 2007; 43(7):2138-2142.

Office action dated Jan. 24, 2014 for U.S. Appl. No. 13/127,226.

Office action dated Feb. 24, 2014 for U.S. Appl. No. 13/505,739.

\* cited by examiner

LITHIUM SECONDARY BATTERIES WITH POSITIVE ELECTRODE COMPOSITIONS AND THEIR METHODS OF MANUFACTURING

FIELD OF THE INVENTION

The invention relates to rechargeable lithium secondary batteries that may exhibit high power and high energy density. More particularly, the invention relates to positive electrode compositions and methods of manufacturing electrodes for use in lithium secondary batteries.

BACKGROUND OF THE INVENTION

Rechargeable lithium batteries have found an increasing number of applications in recent years. The possibility to reduce the size of these devices makes them particularly attractive for various applications especially for portable electronic devices. Additionally there are further uses envisioned in the future, particularly in emerging high power applications like portable mechanical tools and hybrid or all-electric vehicles.

The performance of rechargeable lithium batteries depends upon the characteristics of electrodes and materials used therein. The energy density in commercial lithium ion batteries generally decreases as power density increases. For example, U.S. Pat. Nos. 6,337,156 and 6,682,849 (incorporated by reference herein in their entirety) describe electrodes for secondary batteries, though it has been observed that the electrodes as disclosed do not often provide satisfactory high power and high energy density levels. Moreover, lithium metal phosphate electrodes as described in EP 1722428 (incorporated by reference herein in its entirety) for secondary batteries in the prior art often display poor rate behavior, and therefore their capacity at high rates, e.g. at 2 C, is often far away from the desired capacity.

Therefore, a need exists for improved high power lithium secondary batteries with good high rate behavior and methods of manufacturing related electrodes therein.

SUMMARY OF THE INVENTION

The invention is related to secondary lithium battery systems and methods for their manufacture. Various aspects of the invention described herein may be applied to the applications set forth below or for any other types of lithium batteries. The invention may be applied as a standalone system or method, or as part of an integrated battery or electricity storage system. It shall be understood that different aspects of the invention can be appreciated individually, collectively, or in combination with each other.

One aspect of the invention provides a secondary battery with an electrode. The electrode has a conductive substrate coated with a plurality or powder of flakes. The flakes may have a number average longest dimension of greater than 60 µm, and the flakes may be made of a metal oxide or metal phosphate material. In some embodiments of the invention, the plurality of flakes may be aligned to form a cathode coating that is at least 30 µm thick. In some embodiments of the invention, the flakes may have a shortest dimension of about 17 µm or 25 µm. The flakes may be monocrystalline or polycrystalline. In some embodiments of the invention, there may be a filler of a powder that may be metal oxide or metal phosphate material or a combination thereof, which may fill in the spaces or voids between the plurality of flakes.

In some embodiments of the invention, the metal oxide material may be selected from the group consisting of $LiCoO_2$, $LiMn_2O_4$, $Li(M1_{x1}M2_{x2}Co_{1-x1-x2})O_2$ where M1 and M2 are selected from among Li, Ni, Mn, Cr, Ti, Mg, or Al, $0 \leq x1 \leq 0.5$ and $0 \leq x2 \leq 0.5$. In some embodiments of the invention, the metal oxide material may be $LiM1_{(1-x)}Mn_xO_2$ where $0 < x < 0.8$ and M1 represents one or more metal elements.

Another aspect of the invention provides a method for making a positive electrode material for a secondary battery. The method involves a step of preparing flakes of a cathode active material. Next, flakes of a desired size are separated by passing them through and onto the appropriate metal screens. A flake slurry is then prepared by combining the classified polycrystalline flakes with a filler powder, a conductive powder and a binder with a solvent. The slurry is then coated on a conductive substrate. The coated substrate is heated to evaporate the solvent and then pressed to a desired final electrode thickness.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The features and advantages of the invention may be further explained by reference to the following detailed description and accompanying drawings that sets forth illustrative embodiments.

DETAILED DESCRIPTION OF THE INVENTION

While embodiments of the invention are shown and described herein, it will be obvious to those skilled in the art that such embodiments are provided by way of example only.

Numerous variations, changes, and substitutions will be apparent to those skilled in the art without departing from the scope of the invention. It shall be understood that such alternatives to embodiments of the invention described herein are considered as part of the invention.

For the purpose of this description of the invention, the term "particle" shall be construed as any finely dispersed regularly or irregularly formed single structure which may be present in ordered or disordered crystalline, i.e., in monocrystalline or polycrystalline, or amorphous form. A plurality of primary particles may aggregate to form secondary or flake structures in accordance with the invention. Alternatively, secondary structures or particles may agglomerate to form tertiary or flake structures. The term "flake" may be construed as a plurality of individual particles or secondary (intermediary) structures that in turn are composed of primary particles.

Figure 1:
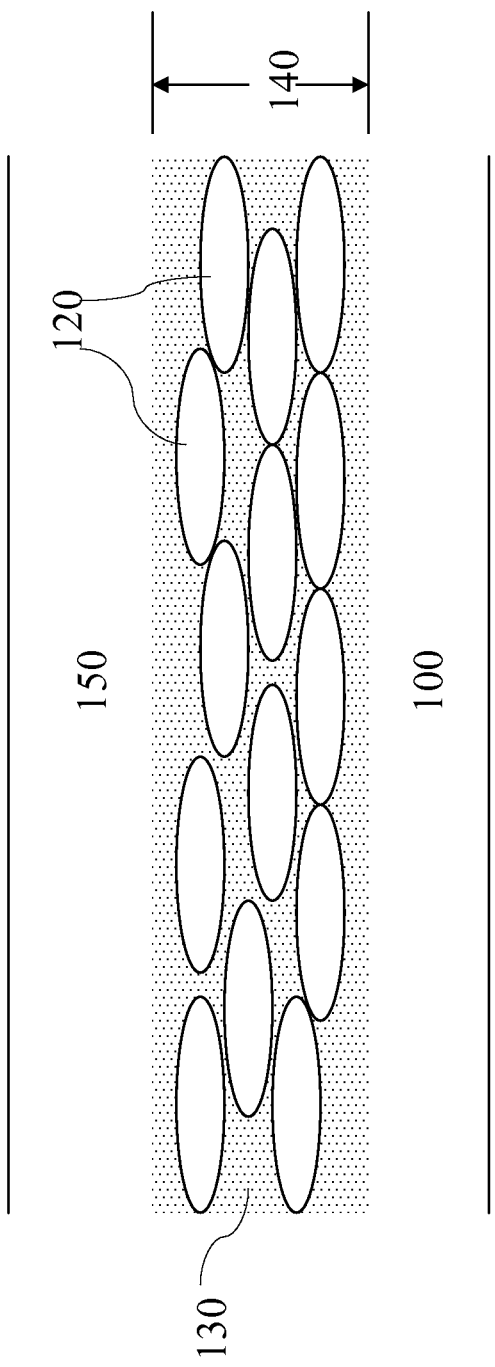
FIG. 1 illustrates a cathode or positive electrode with a coating formed with flakes manufactured in accordance with the invention.

FIG. 1 illustrates an electrode manufactured in accordance with principles of the invention. The electrode may be constructed as a cathode component for lithium secondary batteries. A cathode or active material coating having a predetermined thickness 140 may be applied or deposited onto a substrate layer 100. The coating may include a plurality of elongated structures or flakes 120 formed in accordance with another aspect of the invention. A filler 130 may be also included as part of the cathode coating in combination with the flakes 120. Moreover, the coating may be disposed in fluid contact with an electrolyte 150. The interaction between an active material and an electrolyte in a battery is well known. Any electrolyte appropriate for use in a lithium battery can also be used with the positive electrodes provided herein. For lithium ion battery applications, lithium ions during a discharge phase will move rapidly through the electrolyte 150 to become intercalated into the active material.

A variety of electrolytes may be selected for use with the invention including those in any form, such as liquid, semisolid, or even solid. The electrolyte should cooperate with active electrode materials to provide chemical reactions which store and release electrical energy, and many such chemistries are already known. For lithium ion battery applications, an electrolyte can be generally selected from lithium ion conducting chemicals such as lithium hexafluorophosphate in ethylene carbonate and dimethyl carbonate. Also, for safe operation of the cells, the electrolyte may be preferably selected from a non-flammable group of chemicals.

It shall be understood that while FIG. 1 depicts a single layer cathode coating, the number of layers may vary in accordance with the invention from electrode to electrode, and battery to battery depending on selected applications. The coating for example is commonly double sided or layered so that both sides of the substrate have a layer of coating.

The coating may comprise elongated structures or flakes with relatively greater average longest dimensions. The elongated structures or flakes provided herein tend to lie down flat on and generally parallel to a substrate, and are therefore less likely as such to permeate or pierce adjoining separator sheets or films. Furthermore, these longer flakes may form relatively thinner cathode coatings which are distinguishable from other known particles that are relatively shorter yet form relatively thicker cathode coatings. The flakes provided herein have relatively greater average longest dimensions and thus tend to settle and lie flatter than shorter particles, which can even lie upright relative to a substrate within a coating but not penetrate the coating layer. For example, a relatively thin cathode coating may be formed that is preferably at least 30 μm thick with a plurality of substantially aligned flakes therein. In other embodiments of the invention, a cathode coating may be provided with a thickness of about 35, 40, 45, 50, 55, 60, 65, 70, 75, 80, 85, 90, 95 or 100 μm. Moreover, the inter-particle connectivity provided within the electrode coatings herein may facilitate electron transport. The coatings include active material flakes that can be densely packed with significant inter-particle connectivity. The flakes can thus experience a physical joining without an interface or boundary. The lack of inter-particle connectivity may otherwise require electrons to hop across or tunnel through to an adjacent or next particle. The coatings provided herein thus contain active material flakes having a unique morphology that offers relatively high inter-particle connectivity. At the same time, the flakes may achieve general physical alignment within the coatings whereby flakes within any given layer has multiple points of contacts with those from adjacent layers. This property may at least in part provide secondary batteries with increased power and energy density compared to other morphologically different materials and particle shapes.

It shall be understood that the electrode shown in FIG. 1 may be a section of a rechargeable secondary battery, and while not shown, another electrode (anode) can be assembled and combined as known to those of ordinary skill in the field.

Flake Dimensions

The flakes provided in accordance with the invention can be manufactured for various secondary batteries. These elongated structures may be layered as part of a coating onto a conductive substrate to form an electrode. The starting active materials selected herein may provide various flake or particle sizes allowing for its use as a positive electrode material in accordance with the invention.

In general, the secondary particle or flake sizes herein range from a number average longest dimension from about 60 to 200 μm. A plurality of flakes may be stacked and interwoven within a cathode coating, wherein the flakes preferably have a number average longest dimension preferably greater than about 60 μm. The flakes may be also formed with a number average longest dimension preferably greater than 65, 70, 75, 80, 85, 90, 95, 100, 110, 120, 130, 140, 175, 185, 190 or 200 μm.

Larger flake sizes greater than 50 μm of cathode active material are generally preferred. Such elongated structures or flakes are noticeably longer or have significantly greater longest dimensions than known active material structures or particle morphology. In addition, the flakes may be formed with a smallest or shortest dimension of about 17, 19, 21, 23 or 25 μm. Meanwhile, the flakes or secondary particles provided herein may be in turn formed from individual primary particles. The primary particles may have a size ranging from about 10-500 nanometers ($10^{-9}$ m) (longest dimension). The use of primary particles in these (nano) ranges may thus improve the packing density and inter-particle connectivity of selected active materials. Any active material suitable for use as a cathode material may be selected as building block or primary particle to form higher order secondary particles or flakes in accordance with the invention to form a positive electrode for a lithium battery.

The use of metal oxide flakes as cathode active materials provided herein has been observed to give rise to high power and high energy batteries. Relatively smaller flake structures have been previously described for use with secondary batteries utilizing a lithiated oxide cathode and either a titanium disulfide or a carbon anode. (See, U.S. Pat. Nos. 6,337,156 and 6,682,849—Narang). Such coatings however included fine particles measuring 20 to 50 μm in the longest dimension, which are generally of the shape of prolate spheroids with aspect ratios in orthogonal x, y and z axes averaging approximately 3:1:1. Meanwhile, the elongated structures which are larger than the above particles provided in accordance with the invention with preferable aspect ratios of approximately 6:6:1 surprisingly demonstrate improved performance characteristics. These unexpected results may be attributed at least in part to the flake morphology and relatively longer structural dimensions, whereby the longest dimension of these structures fall within a range of substantially larger than 50 μm, and preferably greater than 100 μm. During experimentation, the flake or tertiary particle sizes were measured by passing the active material through screens which have approximately square openings. The screen sizes used (in U.S. Mesh sizes) can be 100, 150 and 230, which correspond respectively to 150, 105 and 63 μm. Observation of SEM images (see FIG. 2) may confirm the size of the flakes and tertiary structures provided herein. The largest dimension of formed flakes may therefore be at least the dimension of a selected screen size, and can be significantly longer, resulting in flakes with longest dimensions larger than 63, 105 and 150 μm.

Active Materials

The flakes and elongated structures provided in accordance with the invention may be formed from a variety of active materials including one or more metal oxides or metal phosphates.

Examples of active materials that can be used for constructing the flakes herein include metal oxides such as lithium cobalt oxide ($LiCoO_2$). For example, concepts of the invention may be applied to the $LiCoO_2$ compositions described in U.S. Pat. Nos. 6,337,156 and 6,682,849 (Narang) to construct cathodes having elongated active material flakes for use in high power batteries.

Other active materials that may be selected herein include $LiMn_2O_4$, $Li(M1M2CO)O_2$ where M1 and M2 are selected from among Li, Ni, Mn, Cr, Ti, Mg, or Al. Alternatively, the invention may incorporate a metal oxide material that is a composite with $Li_2Mn_2O_3$, where the other component of the composite has a layered or spinel type structure as described in U.S. Pat. No. 7,303,840 (Thackeray), which is incorporated by reference herein in its entirety. In some embodiments of the invention, the metal oxide material may be selected from the group consisting of $LiCoO_2$, $LiMn_2O_4$, $Li(M1_{x1}M2_{x2}Co_{1-x1-x2})O_2$ where M1 and M2 are selected from among Li, Ni, Mn, Cr, Ti, Mg, or Al, $0 \leq x1 \leq 0.5$ and $0 \leq x2 \leq 0.5$. In some embodiments of the invention, the metal oxide material may be $LiM1_{(1-x)}Mn_xO_2$ where $0 < x < 0.8$ and M1 represents one or more metal elements.

Alternatively, metal phosphate materials may be also selected having the formula $LiMPO_4$, wherein M is selected from one or a combination of Fe, Mn, Ni or Co. For example, an embodiment of the invention may provide electrochemical cells in which a cathode is comprised of such metal phosphate compound as described in U.S. Pat. No. 5,910,382 (Goodenough).

In preferable embodiments of the invention, the metal oxide material may include cathode compositions and nickel-manganese-cobalt (NMC) materials (3M Innovative Properties Company, Battery Cathode Materials, BC-618, BC-718 and BC-723) including those described in U.S. Pat. No. 6,964,828 which is incorporated by reference herein in its entirety. Electrodes utilizing such materials can be described as $LiM1_{(1-x)}Mn_xO_2$ where $0 < x < 0.5$, wherein M1 represents one or more metal elements, and in other embodiments, M1 includes nickel, cobalt or a combination thereof. A more preferable active material for selected cathodes herein includes the specific material $LiNi_{0.33}Co_{0.33}Mn_{0.33}O_2$ (NMC). It has been observed that such electrodes comprising flakes made from NMC in accordance with the invention perform better at high rates of discharge in both pulse mode and continuous mode than electrodes made from particles of NMC.

The initial NMC materials used in accordance with the invention can made from a very fine powder consisting of primary particles. These primary particles may be generally in the shape of spheres with a diameter of approximately 8 μm or less, and preferably 6 μm for certain applications. Alternatively, the NMC powder may consist of secondary particles that in turn are made from primary particles of nanometer dimensions. The NMC can be used to construct secondary structures or flakes provided herein, which may preferably have a longest dimension of 50 μm, 105 μm, or 150 μm or less as measured by a selected screen size used to sieve the flakes. In preferable embodiments, the flakes are also polycrystalline materials made of very fine primary crystals. As previously mentioned, it has been observed that positive electrodes comprising NMC flakes or elongated structures herein demonstrated excellent performance at high rates as compared to the electrodes using only the powder form of NMC. Accordingly, preferable embodiments of the invention may provide NMC batteries for various battery sizes and types, including commonly used 18650 cells, for power tools, mobile and portable electronic devices.

Fillers

A variety of fillers may be incorporated with active materials as part the positive electrode (cathode) coatings herein. One or more fillers may be selected for filling in spaces or voids between the flakes or elongated structures within the coating. A preferable filler may comprise a powder with average particle size less than about 17 μm in any direction. Other alternative fillers may consist of a metal oxide or a metal phosphate material or a combination of metal oxide and metal phosphate materials.

Current Collectors

The active material flakes or elongated structures provided herein can be incorporated into coatings that are deposited onto a current collector or conductive substrate according to known techniques. Exemplary materials for current collectors or conductive substrates include aluminum, copper, nickel, steel and titanium. Current collectors or substrates herein may be configured into various forms including cylindrical structures, grids and foils. Any current collector appropriate for use in a lithium battery can be selected. It shall be understood that the active materials provided in accordance with the invention can be incorporated into a variety of lithium battery formats and configurations, including but not limited to 18650 cylindrical cell type lithium ion batteries.

Figure 2:
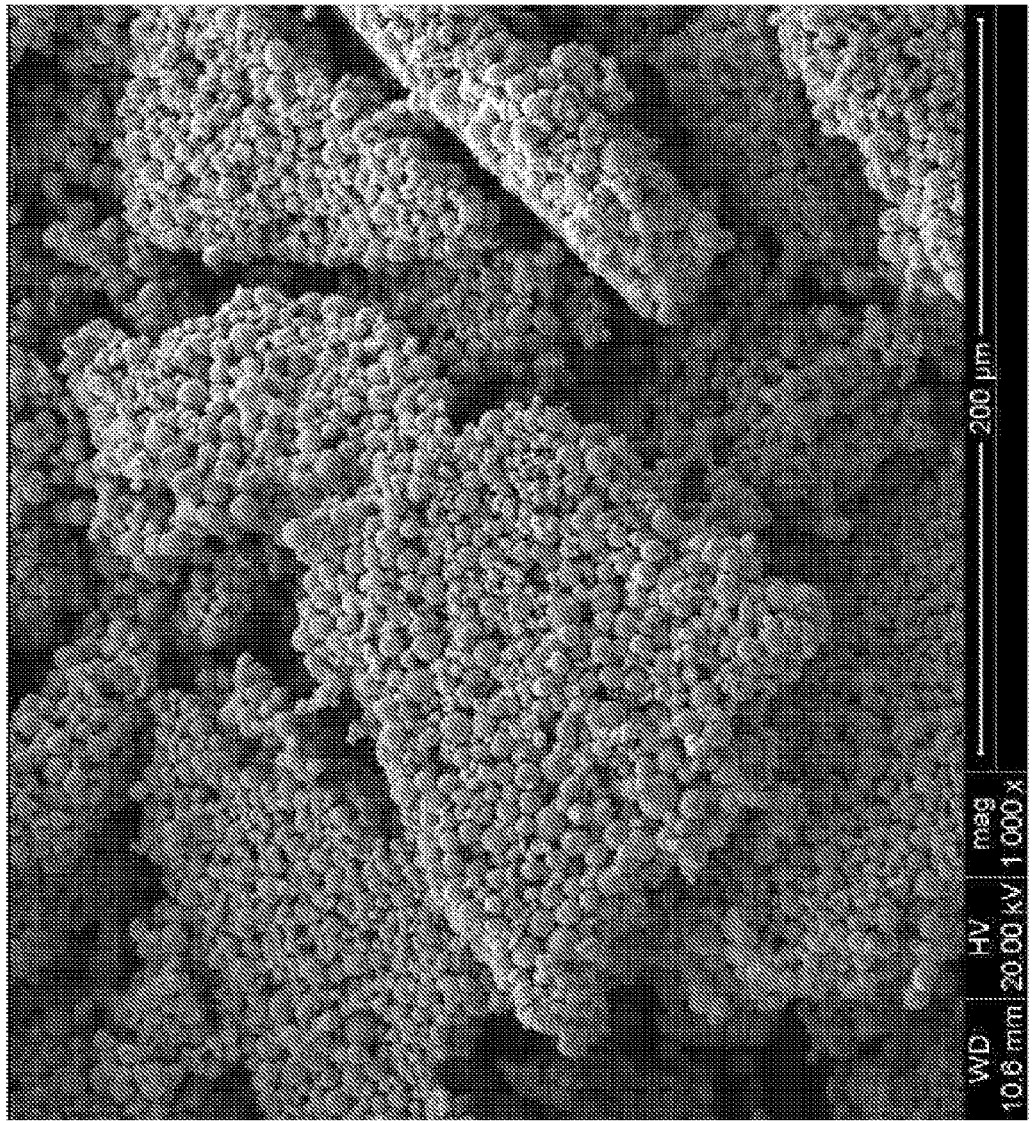
FIG. 2 is a scanning electron microscope (SEM) image of a polycrystalline flake formed in accordance with the invention.
Figure 3A:
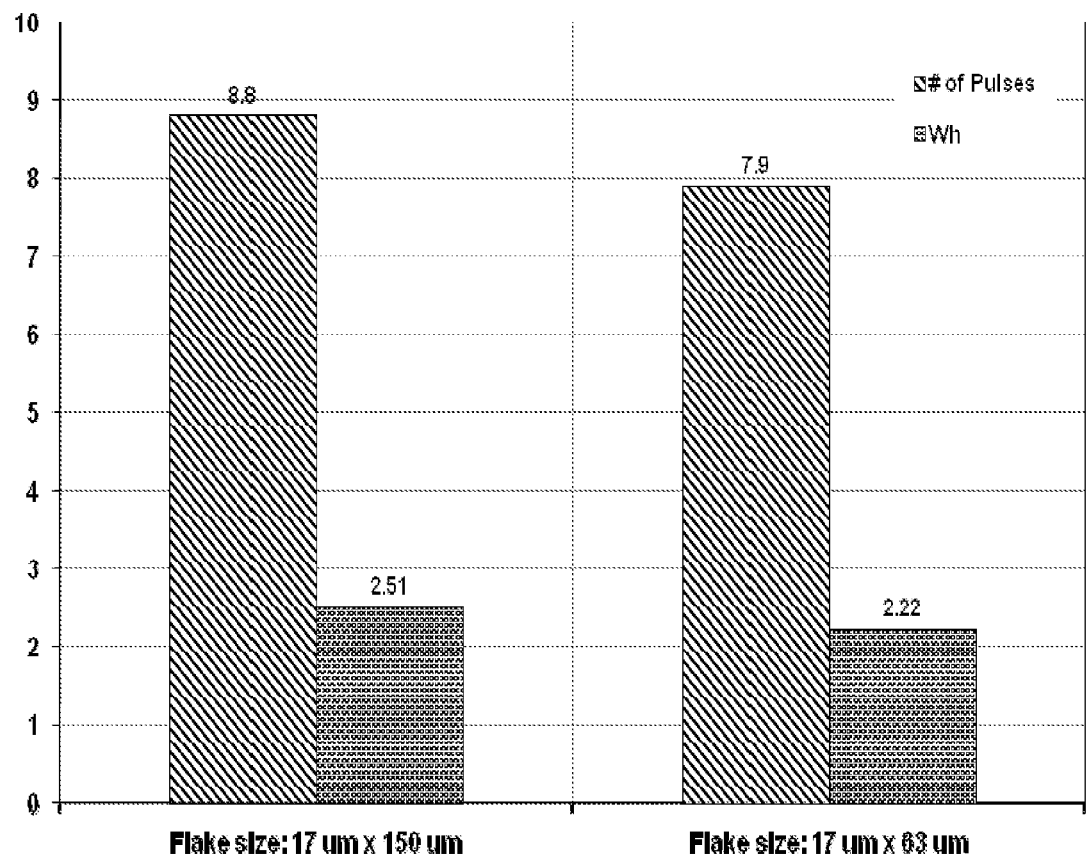
FIGS. 3A-B are performance charts for embodiments of the invention illustrating relationships between capacity and discharge current.
Figure 3B:
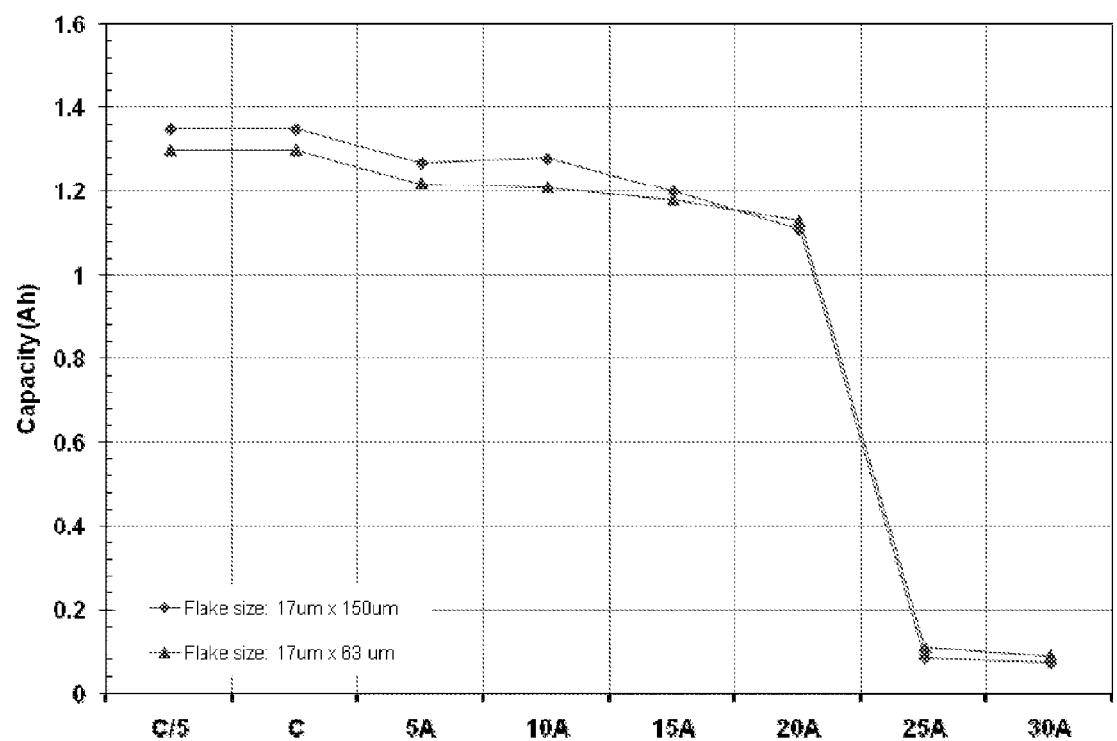

FIG. 2 is a scanning electron microscope (SEM) image of flakes provided in accordance with the invention. The particular flake sizes and shapes herein may be formed with different active materials under various conditions, and may thus vary in morphology. For example, a preferable embodiment of the invention incorporates an NMC powder with small primary particles as described elsewhere herein. The small particles may be combined in accordance with another embodiment of the invention to form secondary structures as can be seen in the SEM. One or more secondary structures can be combined in turn to form the overall flake structures provided herein. The secondary structures may have a preferable average particle size of 6 μm. Therefore, preferable embodiments of the invention may be described as having three ranges or types of particles: primary particles in the nanometer range, secondary particles in the 6 μm range, and flakes with an average number longest dimension in a preferable range of 50 μm and greater. It has been observed that improved battery performance can be achieved with different size flakes, including some in the 63 μm range and even larger.

The flakes or secondary particles as shown in FIG. 2 may be monocrystalline, or preferably polycrystalline. These structures can be manufactured in accordance with another aspect of the invention as described elsewhere herein.

FIGS. 3A-B and 4A-B are graphs that describe the performance for exemplary flakes formed in accordance with the invention as may be depicted in FIG. 2. It has been observed that with some flakes similar battery performance may be achieved independent or regardless of actual flake size.

For example, cathode coatings with two different flake sizes were tested: a first flake size of 17 μm (shortest dimension)×150 μm (longest dimension), and a second flake size of 17 μm×63 μm. A pulse test was conducted using each flake size with results shown in FIG. 3A, wherein 35 A pulses were delivered for 10 second periods (pulse length). Comparable battery performance was achieved as illustrated with both flake sizes with respect to the number of pulses and measured watt-hrs (Wh). In addition, a rate test was conducted using each flake size with results shown in FIG. 3B, wherein eight different discharge current levels were tested and after charging at 1.3 A. Discharge was at C/5, C, 5 A, 10 A, 15 A, 20 A, 25 A and 30 A, while charging at 1.3 A after each discharge current. Similar performance was observed for the batteries with different flake sizes at each discharge current level.

Figure 4A:
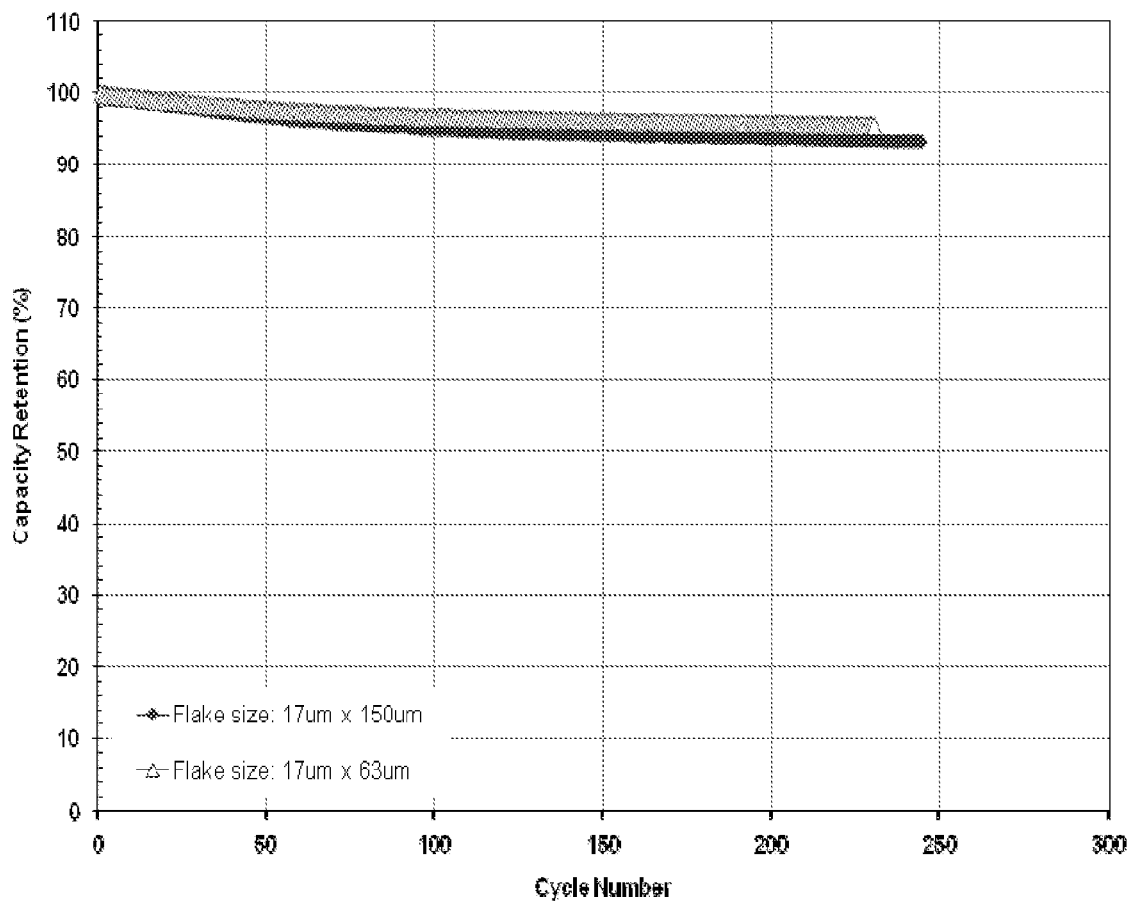
FIGS. 4A-B are performance charts for embodiments of the invention illustrating relationships between capacity and number of cycles.
Figure 4B:
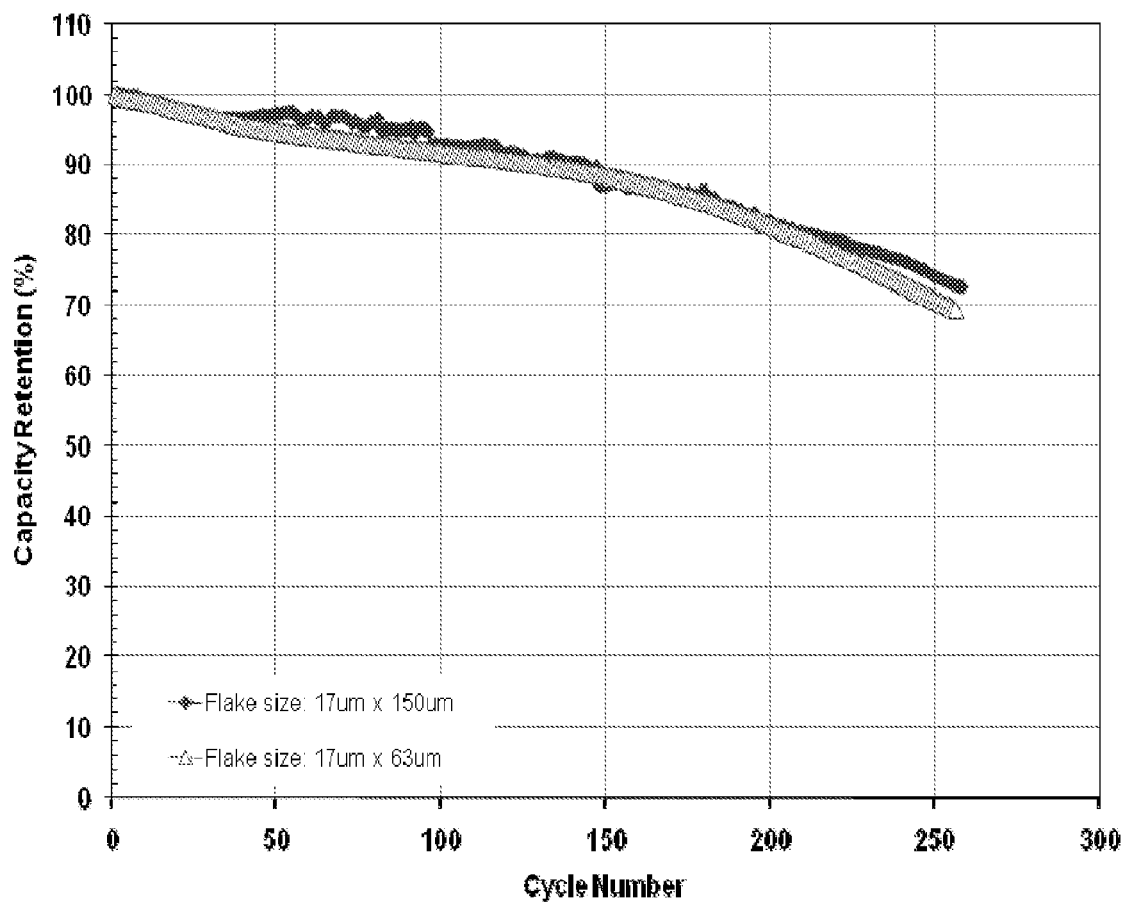

Other testing was carried out with cathodes incorporating the two flake sizes as shown in FIGS. 4A-B. More than 200 cycles were achieved at relatively high rates regardless of flake size. As shown in FIG. 4A, the amount that the battery capacity diminished over the number of cycles was comparable for each flake size. During this cycle test, discharge was tested at 5 A, and charged at 1.3 A (4.2-2.5V; RT). Another cycle test with higher energy pulses was also conducted and yielded similar relative performance data. As shown in FIG. 4B, capacity diminished at a greater rate over the number of cycles as expected but the rate was comparably the same for each flake size. About 208-212 cycles were achieved at 10 A discharge rate before capacity retention dropped below a desired 80% level. During this cycle test, discharge was tested at 10 A, and charged at 1.3 A (4.2-2.5V; RT).

Figure 5A:
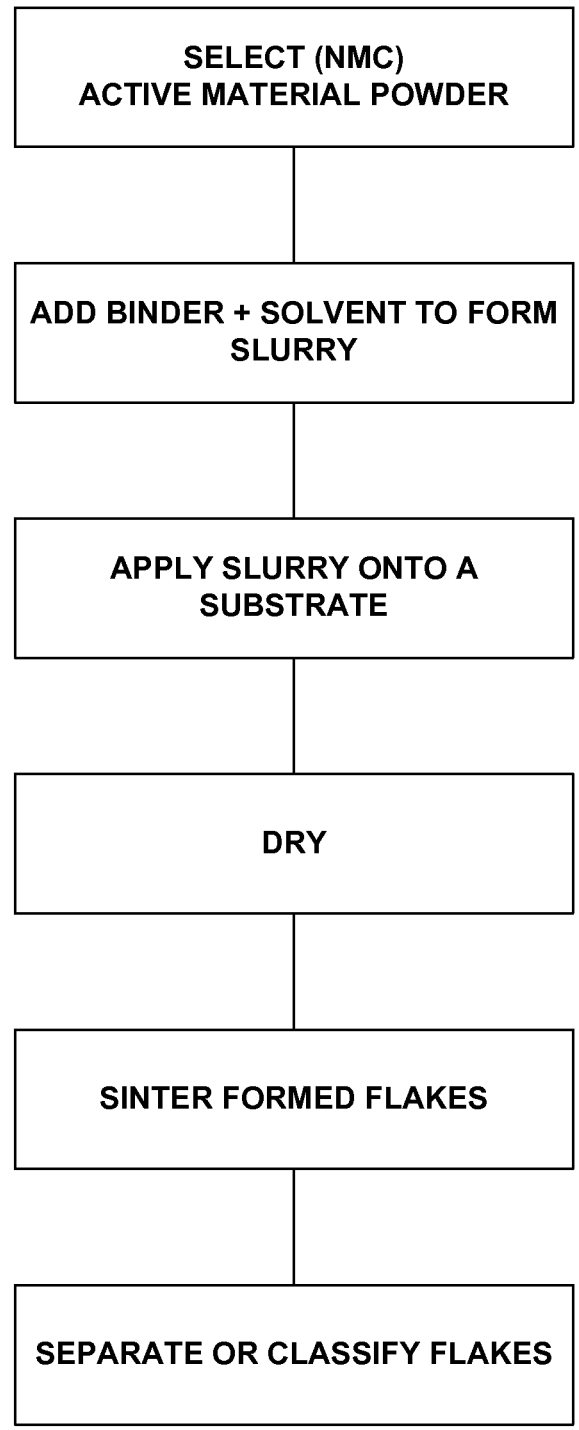
FIGS. 5A-B are flowcharts describing methods of forming active material flakes or positive electrode material for secondary battery electrodes in accordance with another aspect of the invention.
Figure 5B:
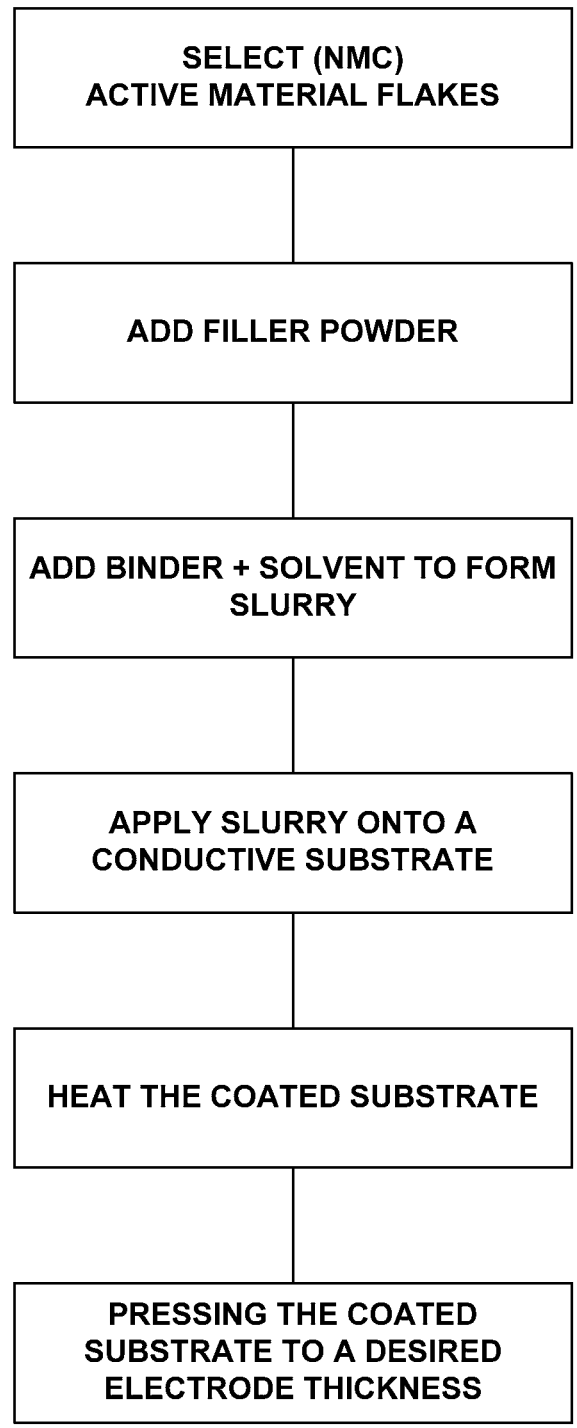

FIGS. 5A-B are flowcharts describing methods of forming active material flakes and positive electrode for secondary batteries. For example, a preferable embodiment of the invention provides a method for initially making or forming active material flakes that can be subsequently used for positive electrode coatings. A cathode active material such as those described elsewhere herein may be selected such as NMC powder. The powder may consist of spherical primary particles with average particle sizes ranging from 10 to 0.50 μm, or more preferably from 6 to 1 μm. A slurry may be prepared by adding a binder and a solvent as known to those of skill in the field. In the formation of active material flakes provided herein, any appropriate binder and solvent may be used. An exemplary binder includes preferably polyvinylpyrrolidone (PVP), and an exemplary solvent includes preferably isopropyl alcohol (IPA). The slurry may be applied on a substrate and dried in accordance with desired parameters. An exemplary substrate includes polyethylene (PE) though other polymer films and materials can be used as known to those of ordinary skill in the field. Following drying using known equipment such as convection dryers, shredders or sieves, the active material may be fragmented or broken up into flakes or elongated structures.

The following two additional steps are further performed in accordance with the invention: sintering the flakes at a desired temperature or range of temperatures for various periods of time, preferably at 400° C. to 1100° C. for 1 to 48 hours; and separating the flakes to isolate those with a desired size by passing the sintered structures onto and through the appropriate metal screens. It shall be understood that any of one or more steps shown in FIG. 5 may be optionally carried out and may be performed in different sequences according to selected applications.

Sintering

In preferable embodiments of the invention, the active material flakes or tertiary particles for positive electrodes are subjected to a sintering process. The flakes, which can be formed from agglomerates of smaller primary particles, are often characterized as being in a "green" state prior to sintering (aka "green flakes"). Subsequently, the flakes can be sintered in a heating apparatus such as an oven or furnace so as to bring about the physical joining of the primary particles and provide inter-particle connectivity. For example, primary particles of NMC active material can be sintered under various conditions which result in the physical joining of active material particles thus forming higher order flakes and/or tertiary particles. It has been observed generally that longer sintering times are called for at a lower temperature, and vice versa.

The flakes may be sintered at one or more desired temperatures or ranges over one or more selected periods of time. For example, flakes may be sintered according a combination of any of the following temperatures and/or time periods: a temperature of approximately 400, 500, 600, 700, 800, 900, 1000, 1100 or 1200° C.; a time period of approximately 1, 5, 10, 15, 20, 25, 30, 35, 40, 45, 46, 47, 48, 49 or 50 hours. The flakes provided in accordance with the invention can be sintered under any conditions that may result in the physical joining of active material particles so as to provide desired inter-particle connectivity.

Classification/Categorization of Flakes

The flakes formed in accordance with this aspect of the invention may vary in size depending on various conditions. As known to those of skill in the field, these flakes may be observed through SEM photographs to study and determine the actual flake sizes on a mass (or number) average basis. It is preferable to classify or categorize the flakes or elongated structures herein according to their sizes with conventional separation systems and methodologies.

For example, sieving and screening are methods of separating a mixture or grains or particles into 2 or more size fractions. The oversized particles of materials are trapped above a screen, while undersized materials can pass through the screen. Sieves can be used in stacks, to divide samples up into various size fractions, and hence determine particle size distributions. Sieves and screens are usually used for larger particle sized materials, i.e., greater than approximately 50 μm (0.050 mm).

Two scales commonly used to classify particle sizes are the US Sieve Series and Tyler Equivalent, sometimes referred to as Tyler Mesh Size or Tyler Standard Sieve Series. The most common mesh opening sizes for these scales are given in the table below and provide an indication of particle sizes.

| US Sieve Size | Tyler Equivalent | Opening | |
| --- | --- | --- | --- |
| | | mm | in |
| — | 2½ Mesh | 8.00 | 0.312 |
| — | 3 Mesh | 6.73 | 0.265 |
| No. 3½ | 3½ Mesh | 5.66 | 0.233 |
| No. 4 | 4 Mesh | 4.76 | 0.187 |

-continued

| US Sieve Size | Tyler Equivalent | Opening mm | Opening in |
|---|---|---|---|
| No. 5 | 5 Mesh | 4.00 | 0.157 |
| No. 6 | 6 Mesh | 3.36 | 0.132 |
| No. 7 | 7 Mesh | 2.83 | 0.111 |
| No. 8 | 8 Mesh | 2.38 | 0.0937 |
| No. 10 | 9 Mesh | 2.00 | 0.0787 |
| No. 12 | 10 Mesh | 1.68 | 0.0661 |
| No. 14 | 12 Mesh | 1.41 | 0.0555 |
| No. 16 | 14 Mesh | 1.19 | 0.0469 |
| No. 18 | 16 Mesh | 1.00 | 0.0394 |
| No. 20 | 20 Mesh | 0.841 | 0.0331 |
| No. 25 | 24 Mesh | 0.707 | 0.0278 |
| No. 30 | 28 Mesh | 0.595 | 0.0234 |
| No. 35 | 32 Mesh | 0.500 | 0.0197 |
| No. 40 | 35 Mesh | 0.420 | 0.0165 |
| No. 45 | 42 Mesh | 0.354 | 0.0139 |
| No. 50 | 48 Mesh | 0.297 | 0.0117 |
| No. 60 | 60 Mesh | 0.250 | 0.0098 |
| No. 70 | 65 Mesh | 0.210 | 0.0083 |
| No. 80 | 80 Mesh | 0.177 | 0.0070 |
| No. 100 | 100 Mesh | 0.149 | 0.0059 |
| No. 120 | 115 Mesh | 0.125 | 0.0049 |
| No. 140 | 150 Mesh | 0.105 | 0.0041 |
| No. 170 | 170 Mesh | 0.088 | 0.0035 |
| No. 200 | 200 Mesh | 0.074 | 0.0029 |
| No. 230 | 250 Mesh | 0.063 | 0.0025 |
| No. 270 | 270 Mesh | 0.053 | 0.0021 |
| No. 325 | 325 Mesh | 0.044 | 0.0017 |
| No. 400 | 400 Mesh | 0.037 | 0.0015 |

Source: www.AZoM.com

The mesh number system is a measure of how many openings there are per linear inch in a screen. Sizes vary by a factor of $\sqrt{2}$. This can easily be determined as screens are made from wires of standard diameters, however, opening sizes can vary slightly due to wear and distortion. US Sieve Sizes differ from Tyler Screen sizes in that they are independent scales based on arbitrary numbers.

Preparing Flake Slurry

A predetermined quantity of classified flakes may be selected, with flakes that are formed in accordance with other aspects of the invention. A slurry of the active material flakes can be prepared by adding a selected filler powder, a conductive powder, a binder and a solvent. In the formation of active material flake slurries provided herein, any appropriate binder and solvent may be used. Exemplary conductive powders or agents include carbon black, acetylene black, KETJEN BLACK, Super-P, PureBlack, natural graphite, synthetic graphite, or expanded graphite. In some embodiments, the conductive agents may be a blend of the above. The added carbon herein is not limited to specific grades, carbon sources or manufactures thereof. Exemplary binders include preferably polyvinylidene fluoride (PVDF), polytetrafluoroethylene (PTFE), ethylene propylene diene ter-polymer/monomer/M class rubber (EPDM) and polyvinyl alcohol (PVA). Exemplary solvents include preferably N-methyl-2-pyrrolidone (NMP), an alcohol (ethanol) and an alcohol/water mixtures.

In alternative embodiments of the invention, the flakes may be formed with a carbon coating which is in intimate contact with their surface. This may increase the capacity and overall conductivity of an electrode.

It has been observed that the flakes or elongated particles herein can be easily handled when included in a flake slurry. While these relatively larger structures are formed with relatively greater longest dimensions, they were found to provide relatively smooth electrode coatings after solvent evaporation, and especially after compressing the electrodes. This suggests that applying a flow field through known techniques such as through a roll coating process may encourage the flakes to lie flat in a coating. A final compression may be applied by a uniaxial press or calendaring machine. The flake slurries may provide cathodes with very high rate capability as demonstrated by the testing of cells containing them described elsewhere herein.

Coated Substrate

The positive electrode materials comprising the flakes herein may be deposited on a variety of substrates. For example, a conductive substrate such as metal foils may be used as known to those of skill in the field. Exemplary materials for substrates include aluminum, copper, nickel, steel and titanium. Accordingly, said flakes may be aligned within a deposited cathode coating, whereby the thickness of the coating on the substrate is preferably less than 50, or preferably greater 30 μm, for certain embodiments of invention.

Many known methods can be used for coating a conductive substrate with active electrode materials described herein. Typical methods include spray coating or spray deposition and techniques such as those described in U.S. Pat. No. 5,721,067 (Jacobs et al.), U.S. Pat. No. 4,649,061 (Rangachar) and U.S. Pat. No. 5,589,300 (Fauteux). Alternatively, other methods to form a coating include roll coating, casting, electro-spraying, thermal spraying, air spraying, ultrasonic spraying, vapor deposition, powder coating and other known techniques.

Compression of Coated Substrate

An advantage of using cathode materials formed with flakes or elongated structures as provided herein is that they can easily be aligned with additional pressure upon manufacture of the positive electrode. Applying a controlled amount of compressive or uniaxial force to the flakes can manipulate the flakes so as to rearrange them in a favorable manner and orientation. For example, their relatively flatter faces can be aligned substantially perpendicular to the direction of an applied force onto the coating. Other advantages of the flake shape are that it provides a large surface area per weight or per volume and a higher packing density as compared to other geometries, thus providing relatively higher electrode energy density for electrodes provided herein.

The cathode coatings provided herein may form upon application of a compressive force or pressure. At the same time, the flakes or elongated structures therein may preferably form closely packed regular or irregular interwoven stacks, thus bringing them in close contact to one another.

The electrode coatings herein may be deposited and layered onto collector foils or substrates through various known processes such as through a roll coating processes.

In alternative embodiments of the invention, a further step of compacting of the flakes by equipment may be performed using an apparatus such as a roll mill to improve the packing density of the coating. These coatings containing dense positive electrode active material structures may already have sufficient porosity to be wetted by an electrolyte. But their porosity may be further modified for certain applications as known to those of ordinary skill in the field.

Other embodiments of the invention may comprise a further or alternative step of densifying a dried coating by various other means in addition to applying uniaxial pressure, wherein the densifying step aligns the particles along or in a preferred direction or orientation. For example, a final densification procedure can be carried out by means of a platen press or a calender press or any other suitable means. A calendaring step may be also carried out two times (two-pass calendaring) or more in order to achieve a desired level of densification. The densification step may be preferably carried out to provide a greater alignment effect of flakes within an electrode coating. Plus an increased physical contact of the flakes can be achieved as compared to an electrode obtained in a process without the additional step of densification. It is preferable that an applied pressure is a uniaxial pressure which may increase the electrical and ionic conductivity and capacity of the resulting electrodes.

Preferable embodiments of the invention include a densification step that is carried out using a roll mill with a line pressure applied in a wide range from 3000 to 9000 N/cm, preferably 5000 to 7000 N/cm for certain applications. The selected ranges for the line pressure applied can provide the desired alignment of elongated structures in a preferred direction within an electrode coating, thus generating a desired electrode structure. As explained in the foregoing, the elongated structures are preferably configured in the form of flakes and substantially aligned along a common plane.

It shall be understood that other embodiments of the invention do not involve the aforementioned densification or compression steps. For certain applications, an alignment of the flakes or elongated structures can be observed regardless, and such alignment may be attributed at least in part to the inherent densification during the manufacturing process, when the flakes are aligned as a coating is deposited onto a substrate. It may be preferable that the flakes are coated onto a substrate and compressed in preparation of an electrode electrically conductive of the single flakes. But already by the application of the active material composition onto the substrate, an alignment can be achieved. Furthermore, the form of the flakes may depend on the conditions of crystallization which are subject to routine experimentation of a person skilled in the art. In preferable embodiments, the formed structures are in the form of polycrystalline flakes. The particular size and longest dimensions of these flakes are not of utmost importance for many applications. Though for the purposes of the invention, it is preferable that the structures are generally arranged flat and substantially aligned within a coating.

Double Sided Coating

In alternative embodiments of the invention, electrodes may be formed with double sided coatings. A double sided coating may be constructed by following the coating steps described above twice for a selected substrate. A flake slurry may be coated on a first surface of a conductive foil or substrate, and a subsequent step of inverting the coated foil may be performed prior to pressing. A substantially identical or other active material coating can be applied to a second (opposite) surface of the conductive foil. Thereafter a compressing step may be performed by pressing the double sided coated foil to the desired final electrode thickness.

Preparation of Batteries

The positive electrode material provided herein may be used in manufacturing rechargeable lithium secondary batteries. A positive electrode (cathode) can be manufactured by initially preparing a slurry with a variety of classified or categorized flakes formed in accordance with the invention in combination with a selected filler powder, a conductive powder, a binder and a solvent including those described elsewhere herein. The slurry may be then coated onto a conductive substrate, followed by drying or heating the coated substrate to evaporate the solvent, and then pressing the coated substrate to a desired final electrode thickness. The following provides a further description of these steps in accordance with preferable embodiments.

EXAMPLES

Electrochemical Cell Preparation

The invention is further illustrated by way of the following examples which are not meant to limit the scope of the invention. It shall be understood that the following steps and materials, including known alternatives to those of ordinary skill in the field and combinations thereof, fall within the scope of the invention. Some electrode embodiments of the invention were prepared as follows:

Cathodes

Exemplary cathodes can be prepared as follows with an initial mixture containing (percentage by weight): 85-95% of NMC ($LiNi_{1/3}Mn_{1/3}Co_{1/3}O_2$,) (3M); 1-11% Ace Black (Soltex); and 1-5% graphite grade ABG1010 (6.0% graphite grade ABG1045, Superior Graphite). The ingredients can be mixed in a 1-liter jar with alumina grinding media (½" size) for 1.5 hour. Then an additional 4-14% by weight of Kynar grade 761 (Arkema) can be added, and the powders mixed for another 15 minutes. The above mixture can be referred to as the "cathode dry mix." The cathode dry mix can be transferred to a plastic bowl to which 80-130% by weight of NMP (N-methyl pyrrolidone) (Sigma Aldrich) is added. The content of the bowl can be mixed to form the cathode slurry on a shaker for 30 minutes. Then 18-28% by weight of NMC flakes can be then added to the slurry. The slurry may be shaken for another 15 minutes.

The cathode can be made by coating an aluminum foil (20 μm thick, 11 inch wide) with the cathode slurry on a reverse roll coater. The loading (weight of coating per unit area) can be about 14 mg/cm$^2$ per side. Both sides of the aluminum foil can be coated. After coating, the roll of cathode can dry in a vacuum oven at about 120° C. for about 10 hours.

After vacuum drying, the cathode can be calendered between two rolls to about 120 μm thick. The calendered cathode can be then slitted to 54 mm wide and cut to the desired length (about 72 cm). A strip of aluminum (100 μm thick, 4 mm wide) can be ultrasonically welded to the copper foil near the end of the foil to form a tab.

Anodes

Exemplary anodes can be prepared as follows with an initial mixture containing (percentage by weight): 95-99% carbon, grade CPreme G5 (Conoco Phillips) and 1-3% Ace Black carbon black (Soltex). The ingredients can be mixed in a 1-liter jar with alumina grinding media (½" size) for 1.5 hour. Then an additional 0.1-0.9% by weight of oxalic acid (Sigma Aldrich) and 2-12% by weight of Kynar grade 761 (Arkema) can be added and the powders mixed for another 15 minutes. The above mixture can be referred to as the "anode dry mix." The anode dry mix can be transferred to a plastic bowl to which 240-290% by weight of NMP (N-methyl pyrrolidone) (Sigma Aldrich) can be added. The content of the bowl can be mixed to form the anode slurry. The mixing may be done on a shaker for 30 minutes.

The anode can be made by coating a copper foil (13 μm thick, 11 inch wide) with the anode slurry on a reverse roll coater. The loading (weight of coating per unit area) can be about 7.35 mg/cm$^2$ per side. Both sides of the copper foil can be coated. After coating, the roll of anode can dry in a vacuum oven at about 120° C. for about 10 hours.

After vacuum drying, the anode can be calendered between two rolls to about 110 μm thick. The calendered anode can be then slitted to 56 mm wide, and cut to the desired length (about 74 cm). A strip of nickel (100 μm thick, 4 mm wide) may be ultrasonically welded to the copper foil near the end of the foil to form a tab.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for making a positive electrode material for a secondary battery, the method comprising:
   selecting a cathode active material in powder form;
   preparing a particle slurry by mixing a first selected binder and a first selected solvent with the cathode active material;
   evaporating the first selected solvent to thereby form a quantity of elongated polycrystalline flakes of the cathode active material;
   separating or classifying the flakes by passing the flakes through and onto selected metal screens having mesh sizes of 230 Mesh or smaller, thereby providing classified flakes having a longest dimension greater than about 50 μm;
   preparing a flake slurry by combining the classified flakes with a filler powder, a conductive powder and a second binder with a second selected solvent, wherein the filler powder includes a metal oxide material or a metal phosphate material or a combination of metal oxide and metal phosphate materials;
   coating the flake slurry on a conductive substrate;
   heating the coated conductive substrate to evaporate the second selected solvent in said flake slurry, wherein said filler powder is incorporated with said cathode active material; and
   pressing the coated conductive substrate to a given positive electrode thickness for the secondary battery.

2. The method for making a positive electrode material for a secondary battery of claim 1, wherein the conductive substrate is formed with two opposite facing sides, and wherein the step of coating the flake slurry further comprises:
   coating both sides of the conductive substrate; and
   densifying the coated substrate by applying a selected uniaxial pressure that substantially aligns the flakes in a generally preferred orientation.

3. The method for making a positive electrode material for a secondary battery of claim 1, wherein the conductive powder is carbon.

4. The method for making a positive electrode material for a secondary battery of claim 1, wherein separating or classifying the flakes comprises separating a mixture of grains or particles into 2 or more size fractions.

5. The method for making a positive electrode material for a secondary battery of claim 1, wherein the cathode active material is a nickel-manganese-cobalt material.

6. The method for making a positive electrode material for a secondary battery of claim 1, wherein the flakes are aligned to form a cathode coating that is at least 30 μm thick.

7. The method for making a positive electrode material for a secondary battery of claim 1, wherein the flakes have a shortest dimension of about 17 μm.

8. The method for making a positive electrode material for a secondary battery of claim 1, wherein the flakes have a shortest dimension of about 25 μm.

9. The method for making a positive electrode material for a secondary battery of claim 1, wherein the flakes comprise a metal oxide material selected from the group consisting of $LiCoO_2$, $Li(Mn_{1-x3}M3_{x3})_2O_4$, $Li(M1_{x1}M2_{x2}Co_{1-x1-x2})O_2$ where M1 and M2 are selected from among Li, Ni, Mn, Cr, Ti, Mg, or Al, M3 is selected from one or a combination of Li, Ni, Co, Cr, Ti, Mg, or Al, $0 \leq x1 \leq 0.5$, $0 \leq x2 \leq 0.5$ and $0 \leq x3 \leq 0.5$.

10. The method for making a positive electrode material for a secondary battery of claim 1, wherein the flakes comprise $LiM1_{(1-x)}Mn_xO_2$, wherein $0 < x < 0.8$ and M1 represents one or more metal elements.

11. The method for making a positive electrode material for a secondary battery of claim 10, wherein M1 includes nickel, cobalt or a combination thereof.

12. The method for making a positive electrode material for a secondary battery of claim 10, wherein the flakes comprise $LiNi_{0.33}Co_{0.33}Mn_{0.33}O_2$.

13. The method for making a positive electrode material for a secondary battery of claim 1, wherein the flakes comprise a metal phosphate material described by the formula $LiMPO_4$, wherein M is selected from one or a combination of Fe, Mn, Ni or Co.

14. The method for making a positive electrode material for a secondary battery of claim 1, wherein the flakes have a longest dimension greater than about 60 μm.

15. The method for making a positive electrode material for a secondary battery of claim 1, wherein the flakes have a longest dimension greater than about 100 μm.

16. The method for making a positive electrode material for a secondary battery of claim 1, wherein the cathode active material in powder form comprise particles with a diameter of about 8 μm of less.

17. The method for making a positive electrode material for a secondary battery of claim 1, wherein evaporating the first selected solvent comprises drying the particle slurry.

18. A method for making a positive electrode material for a secondary battery, the method comprising:
   selecting a cathode active material in powder form;
   preparing a particle slurry by mixing a first selected binder and a first selected solvent with the cathode active material;
   evaporating the first selected solvent to thereby form a quantity of elongated polycrystalline flakes of the cathode active material;
   separating or classifying the flakes by passing the flakes through and onto selected metal screens having mesh sizes of 230 Mesh or smaller, thereby providing classified flakes having a longest dimension greater than about 50 μm;
   preparing a flake slurry by combining the classified flakes with a filler powder formed of an active material, a conductive powder and a second binder with a second selected solvent, wherein said filler powder comprises a powder with average particle size less than about 17 μm in any direction;
   coating the flake slurry on a conductive substrate;
   heating the coated conductive substrate to evaporate the second selected solvent in said flake slurry, wherein said filler powder formed of an active material is incorporated with said cathode active material; and
   pressing the coated conductive substrate to a given positive electrode thickness for the secondary battery, wherein the filler powder includes a metal oxide material or a metal phosphate material or a combination of metal oxide and metal phosphate materials.

* * * * *